UNITED STATES PATENT OFFICE.

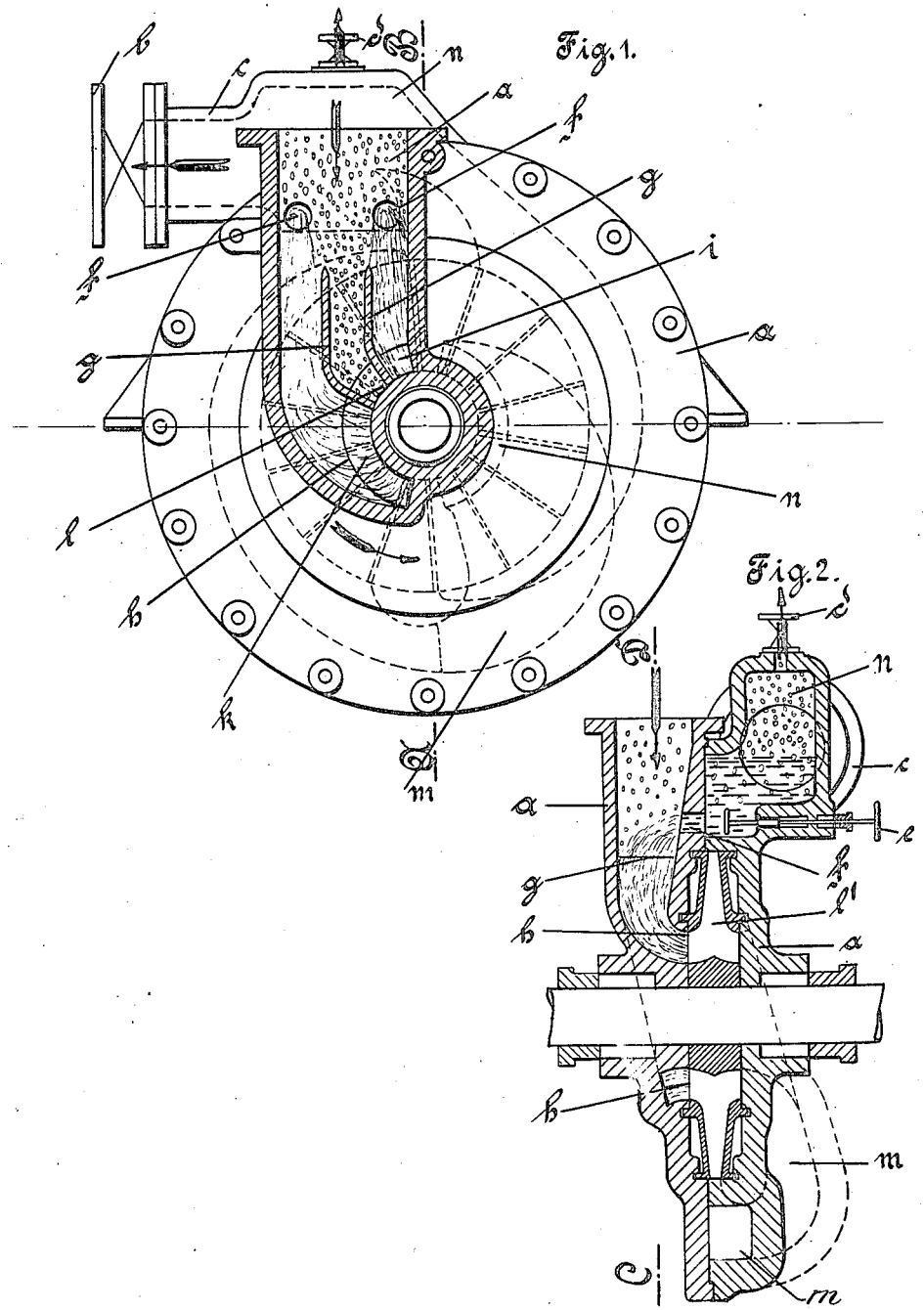

ANTON GENTIL, OF ASCHAFFENBURG, GERMANY.

CENTRIFUGAL PUMP.

1,077,520.  Specification of Letters Patent.  Patented Nov. 4, 1913.

Application filed March 29, 1913. Serial No. 757,571.

*To all whom it may concern:*

Be it known that I, ANTON GENTIL, a subject of the German Emperor, residing at Aschaffenburg, in Germany, have invented certain new and useful Improvements in Centrifugal Pumps, of which the following is a specification.

The object of this invention is to provide an arrangement whereby air sucked into a centrifugal pump with water from the induction pipe is separated from the water prior to delivery.

The invention is illustrated in the accompanying drawing, in which—

Figure 1 is an elevation of the pump in section on the line C—D of Fig. 2, Fig. 2 being an elevation in section on the line A—B of Fig. 1.

In the drawing, $a$ designates an upwardly directed intake conduit, arranged to be joined at its upper end to the supply or suction pipe; $c$ is the delivery or eduction conduit, controlled by a valve $b$. The lower part of the intake conduit is divided by two partitions $g$ into three passages $i$, $l$, $k$ through which fluid from the conduit $a$ can flow to the opening $h$ leading to the vane wheel $l'$. The path of the fluid from the opening $h$ lies through the wheel to a passage $m$ in the casing, and thence back to the wheel, by which it is driven into a chamber $n$ forming part of the conduit $c$. The chamber $n$ forms a kind of dome and has an air valve $d$ at the top. One wall of this chamber is formed by part of the wall of the conduit $a$ and has two openings $f$ located above the passages $i$ and $k$ respectively. These openings are controlled by means of valves $e$.

By virtue of the position of the conduit $a$ the casing remains filled with water when the pump is stopped. Air may accumulate in the conduit $a$ and pipe joined thereto. Prior to starting the pump the valve $b$ is closed and the valves $e$ are opened. On the pump being then started it drives water from the casing into the chamber $n$, whence escape through the conduit $c$ is prevented by the valve $b$. This water is accordingly forced through the openings $f$ into the conduit $a$ and flows into the passages $i$ and $k$ as best shown in Fig. 1. The vanes, rotating as indicated by an arrow at the lower part of Fig. 1, sweep past the opening of the passage $i$ and force the water received from this passage radially outward. This action creates suction in the conduit $a$, whereby air is drawn through the passage $l$ and the water drawn by the vanes through the passage $k$ prevents the return of this air to the conduit $a$. The mixture of air and water is forced through the passage $m$ to the port at which it is again acted on by the vanes, and is then forced into the chamber $n$, in which the air separates from the water and passes out through the valve $d$ at the top of that chamber. When by this means all the air has been removed from the conduit $a$ and pipe joined thereto, water is seen to issue from the valve $d$ and that valve is then closed, together with the valves $e$, and the valve $b$ is opened. The pump then works normally, water being sucked through the conduit $a$ and the three passages $l$, $h$ and $k$.

Instead of having the air delivery joined to the casing, I may have it remote from the pump, joined by suitable piping.

What I claim as my invention and desire to secure by Letters Patent of the United States is:—

1. In a centrifugal pump the combination of a vane-wheel, an induction conduit upwardly directed from said vane-wheel, three ducts arranged for delivery of fluid from said conduit to said vane-wheel, the openings of said ducts to the vane-wheel being arranged in series to be swept in succession by the vanes, an eduction conduit having openings to said induction conduit, said openings located above the first and the last of said ducts respectively, and valves controlling the last-mentioned openings, for the purpose set forth.

2. In a centrifugal pump, the combination of a vane-wheel, an induction conduit upwardly directed from said vane-wheel, three ducts arranged for delivery of fluid from said conduit to said vane-wheel, the openings of said ducts to the vane-wheel being arranged in series to be swept in succession by the vanes, an eduction conduit having openings to said induction conduit, said openings located above the first and the last of said ducts respectively, a valve whereby the outlet of said eduction conduit can be closed, means for the discharge of air from said eduction conduit while said valve is closed, and valves controlling the openings of said eduction conduit to said induction conduit, for the purpose set forth.

In witness whereof I have signed this specification in the presence of two witnesses.

ANTON GENTIL.

Witnesses:
  ALFONS VAN RAPEY,
  JEAN GRUND.